United States Patent [19]
Heh

[11] Patent Number: 5,267,458
[45] Date of Patent: Dec. 7, 1993

[54] CAR LOCK MULTIPLE LOCKING PURPOSES

[76] Inventor: Mao-Lin Heh, c/o Hung Hsing Patent Service Center, P.O. Box 55-1670, Taipei (10477), Taiwan

[21] Appl. No.: 998,145
[22] Filed: Dec. 28, 1992
[51] Int. Cl.⁵ .............................. B60R 25/00
[52] U.S. Cl. ...................... 70/238; 70/199; 70/202; 70/209; 70/225
[58] Field of Search ............... 70/190, 198, 199, 201, 70/202, 225, 226, 238, 209-212

[56] References Cited

U.S. PATENT DOCUMENTS

| | | | |
|---|---|---|---|
| 1,193,679 | 8/1916 | Fox | 70/238 X |
| 1,473,469 | 11/1923 | Cynamon | 70/199 |
| 1,477,165 | 12/1923 | Dobbelaar | 70/199 |
| 1,961,305 | 6/1934 | Rodriguez | 70/202 X |
| 3,898,823 | 8/1975 | Ludeman | 70/209 X |
| 4,015,455 | 4/1977 | Leverton | 70/202 X |
| 4,432,432 | 2/1984 | Martin | 70/238 X |
| 4,699,238 | 10/1987 | Tamir | 70/238 X |
| 5,005,391 | 4/1991 | Gibson | 70/238 |
| 5,007,259 | 4/1991 | Mellard | 70/209 |
| 5,121,617 | 6/1992 | Chen | 70/238 X |
| 5,181,403 | 1/1993 | Lii | 70/233 X |

Primary Examiner—Peter M. Cuomo
Assistant Examiner—Suzanne L. Dino

[57] ABSTRACT

A car lock includes an upper hook member protruding upwardly from a main box to be lockable on a steering wheel of the car, a bifurcate stopping member downwardly extendible from the main box for locking a brake pedal both for preventing slipping on a sloping road surface and for preventing theft of the car, a lower hook member downwardly extendible from the main box to be juxtapositional to the bifurcate stopping member for locking an accelerator pedal, and a positioning lock mounted on the main box operatively lockable for firmly positioning the plural members at their locking positions, thereby simultaneously locking the steering wheel, accelerator pedal, and the brake pedal for both security and safety purposes.

4 Claims, 6 Drawing Sheets

CAR LOCK MULTIPLE LOCKING PURPOSES

BACKGROUND OF THE INVENTION

A conventional lock such as a crutch-shaped lock may be provided for locking a steering wheel of a car. However, it is not enough for a well locking purpose from a security or safety point of view since it can not simultaneously lock the steering wheel, an accelerator pedal and a brake pedal.

It is therefore expected to invent a car lock capable of locking many driving and operating units in a car for a security and safety reason.

SUMMARY OF THE INVENTION

The object of the present invention is to provide a car lock including an upper hook member protruding upwardly from a main box to be lockable on a steering wheel of the car, a bifurcate stopping member downwardly extendible from the main box for locking a brake pedal both for preventing slipping on a sloping road surface and for preventing theft of the car, a lower hook member downwardly extendible from the main box to be juxtapositional to the bifurcate stopping member for locking an accelerator pedal, and a positioning lock mounted on the main box operatively lockable for firmly positioning the plural members at their locking positions, thereby simultaneously locking the steering wheel, accelerator pedal, and the brake pedal for both security and safety purposes.

DETAILED DESCRIPTION

Figure 1:
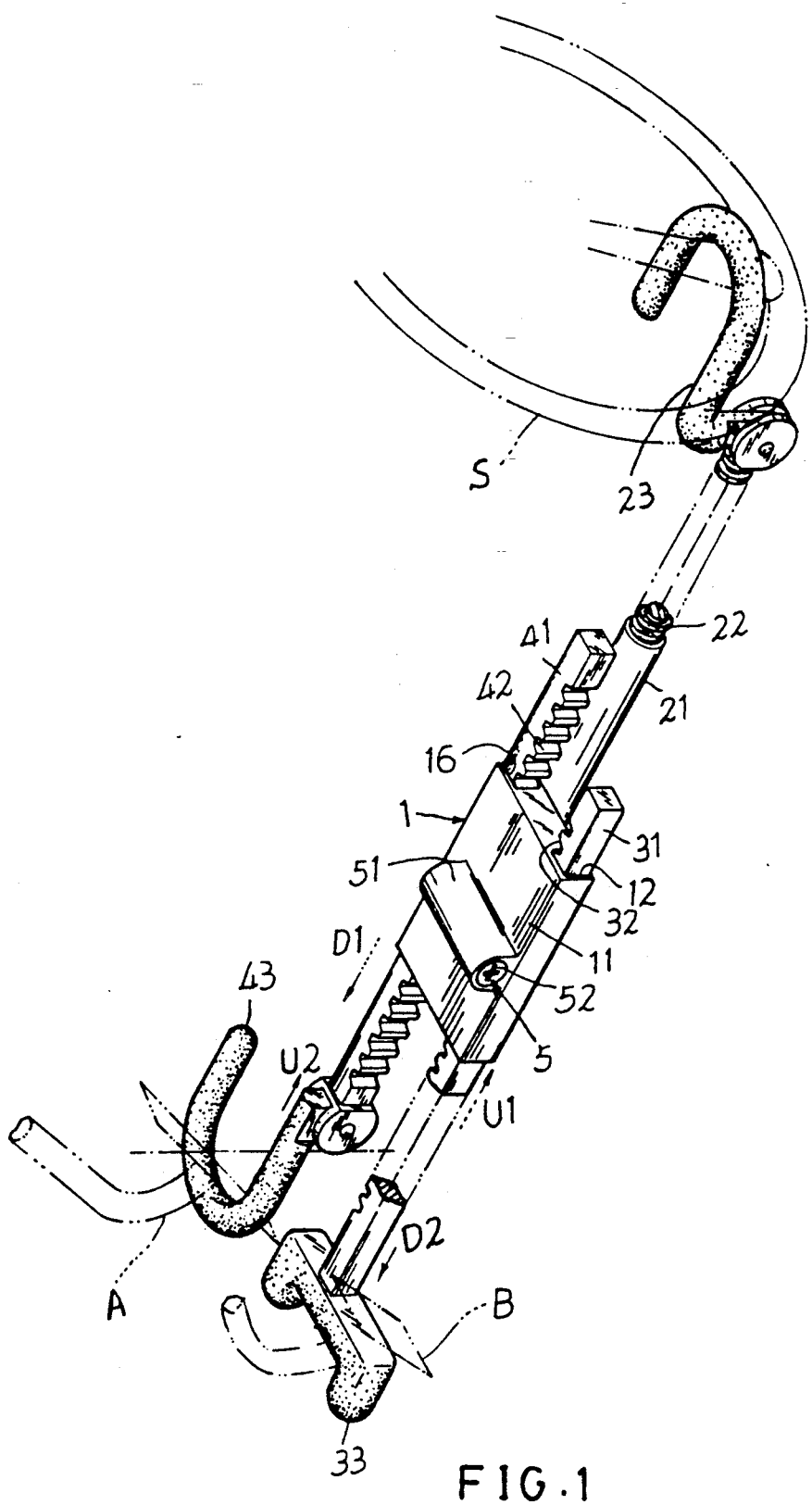
FIG. 1 is an illustration showing a locking application of the present invention.
Figure 2:
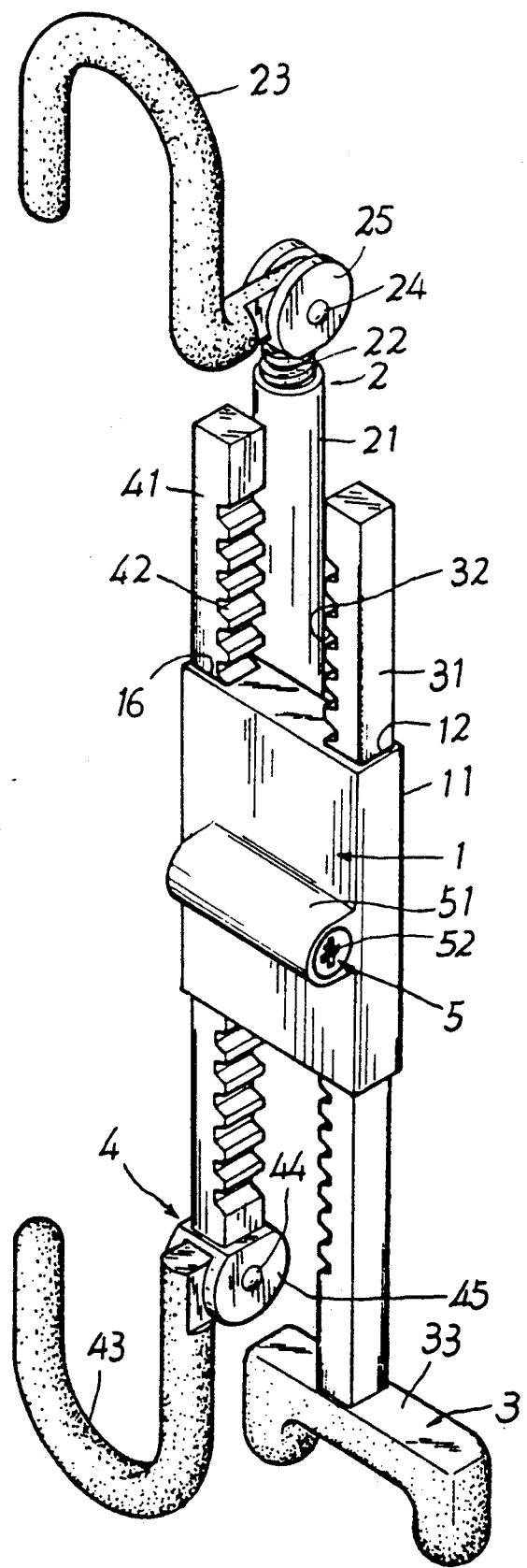
FIG. 2 is a perspective view of the present invention.
Figure 3:
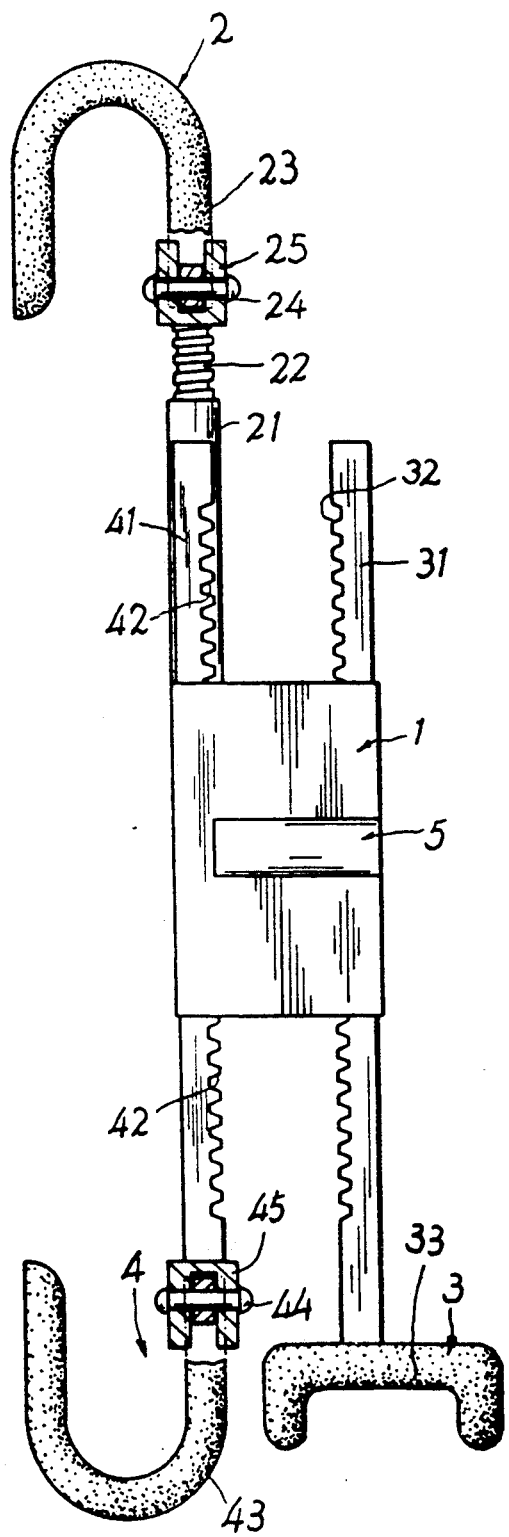
FIG. 3 is a front view of the present invention.
Figure 4:
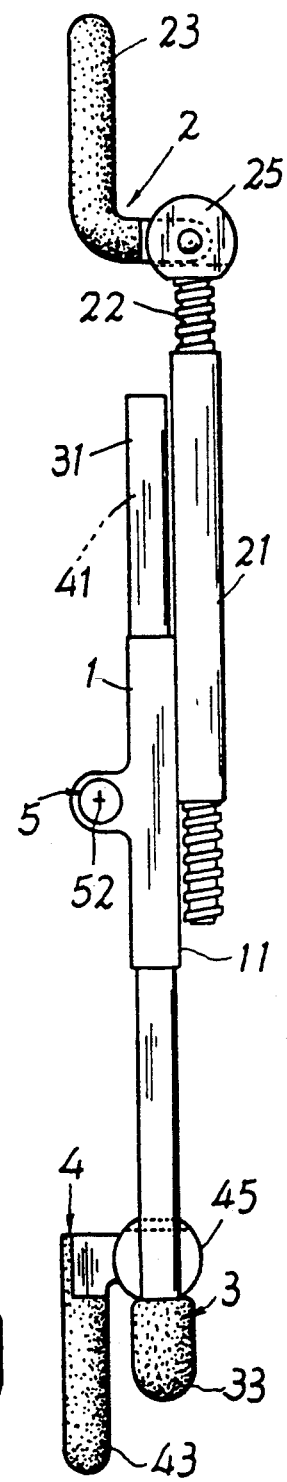
FIG. 4 is a side view of the present invention.

As shown in FIGS. 1-6, the present invention comprises: a main box 1, a steering-wheel locking means 2, a brake locking means 3, an accelerator locking means 4, and a positioning lock 5.

The main box 1 is generally rectangular shaped and composed of a plurality of side walls 11, including: a first rack hole 12 formed in a first side portion of the box 1 for movably passing a first rack 31 of the brake locking means 3 in the first rack hole 12 as slidably limited by a first guiding plate 121 secured in the first side portion of the box 1, a second rack hole 16 formed in a second side portion of the box 1 for movably passing a second rack 41 of the accelerator locking means 4 in the second rack hole 16 as slidably limited by a second guiding plate 161 secured in the second side portion of the box 1, a gear 14 rotatably mounted in the box 1 about a shaft 13 secured in the box 1 in between the first and second racks 31, 41 for simultaneously engaging the two racks 31, 41 diametrically disposed on two opposite sides of the gear 14 having gear teeth 15 circumferentially formed on a perimeter of the gear 14.

Figure 7:
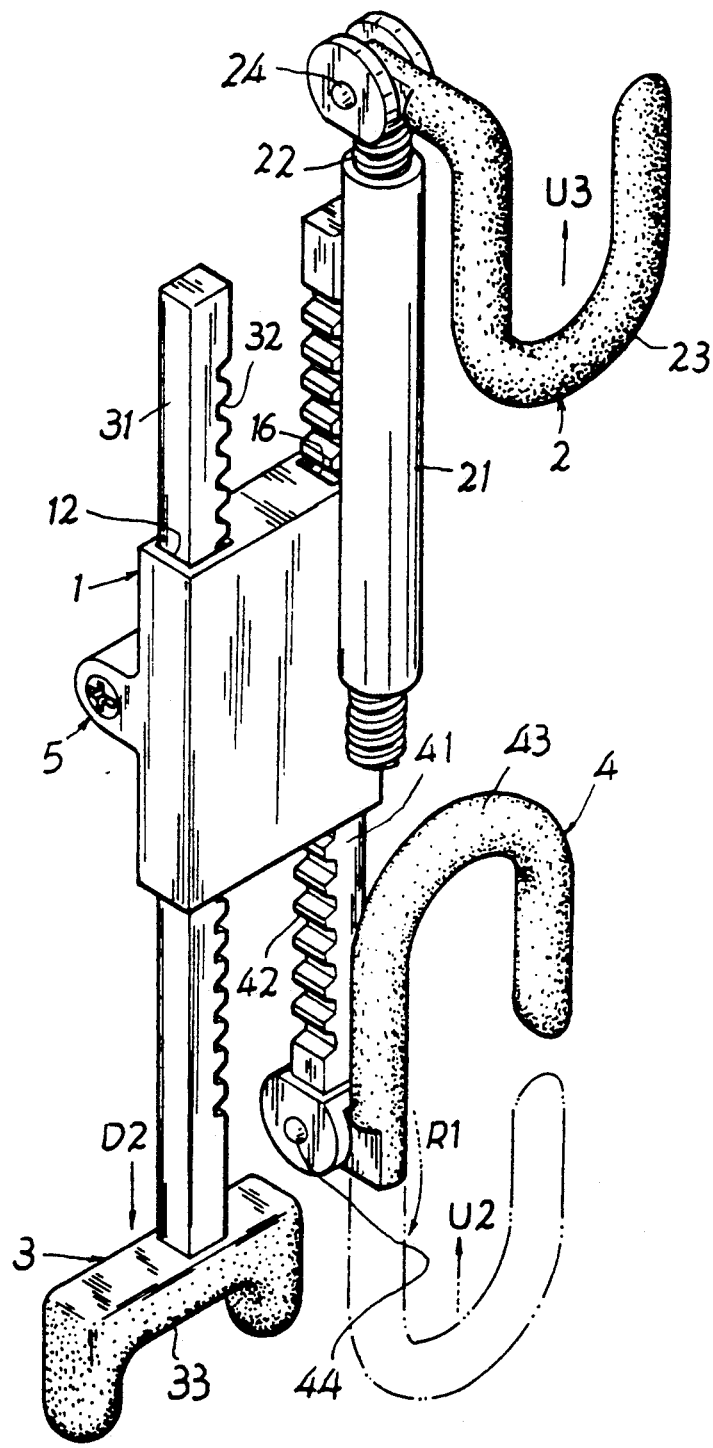
FIG. 7 is an illustration showing another operating application of the present invention.

The steering-wheel locking means 2 includes: a cylinder 21 having female threads formed in a through hole in the cylinder 21 longitudinally protruding upwardly from a side wall 11 of the main box 1, a bolt 22 having male threads formed on the bolt 22 and engageable with the through hole in the cylinder 21 having an upper bracket 25 formed on an upper end portion of the bolt 22, and an upper hook member 23 fixed on the upper bracket 25 by an upper rivet 24 for operatively locking a steering wheel of a car. As shown in FIG. 1, the upper hook member 23 is rivetted on the bolt 22 by orienting the U-shaped hook concavely downwardly for grasping the steering wheel S downwardly as shown in FIG. 1. But, the hook member 23 may also be oriented upwardly (U3) when rivetted on the bolt 22 as shown in FIG. 7 for upwardly retaining the steering wheel S and locking the wheel.

The brake locking means 3 includes: the first rack 31 having a plurality of first rack teeth 32 longitudinally formed on the first rack 31 to be engageable with the gear teeth 15 of the gear 14 rotatably mounted in the main box 1 with the first rack 31 movably held in a first side portion of the main box 1, and a bifurcate stopping member 33 generally formed as an inversed-U-shape for depressibly retaining a brake pedal B as shown in FIG. 1.

The accelerator locking means 4 includes: the second rack 41 having a plurality of second rack teeth 42 longitudinally formed on the second rack 41 to be engageable with the gear teeth 15 of the gear 14 rotatably mounted in the box 1 with the second rack 41 movably held in a second side portion of the main box 1 opposite to the first rack 31 of the brake locking means 3, a lower hook member 43 fixed on a lower bracket 45 by a lower rivet 44 at a lower end portion of the rack 41 for operatively locking a brake pedal of a car.

The positioning lock 5 includes: a lock body 51 transversely formed on the main box 1 having a lock core 52 rotatably mounted in the lock body 51, and a latch member 53 secured on an inner end portion of the lock core 52 operatively engageable with any gear tooth 15 of the gear 14 for locking and preventing the rotation of the gear 14 when inserting a key 54 into a key hole formed in the core 52 for angularly rotating the core 52 and the latch member 53.

Figure 5:
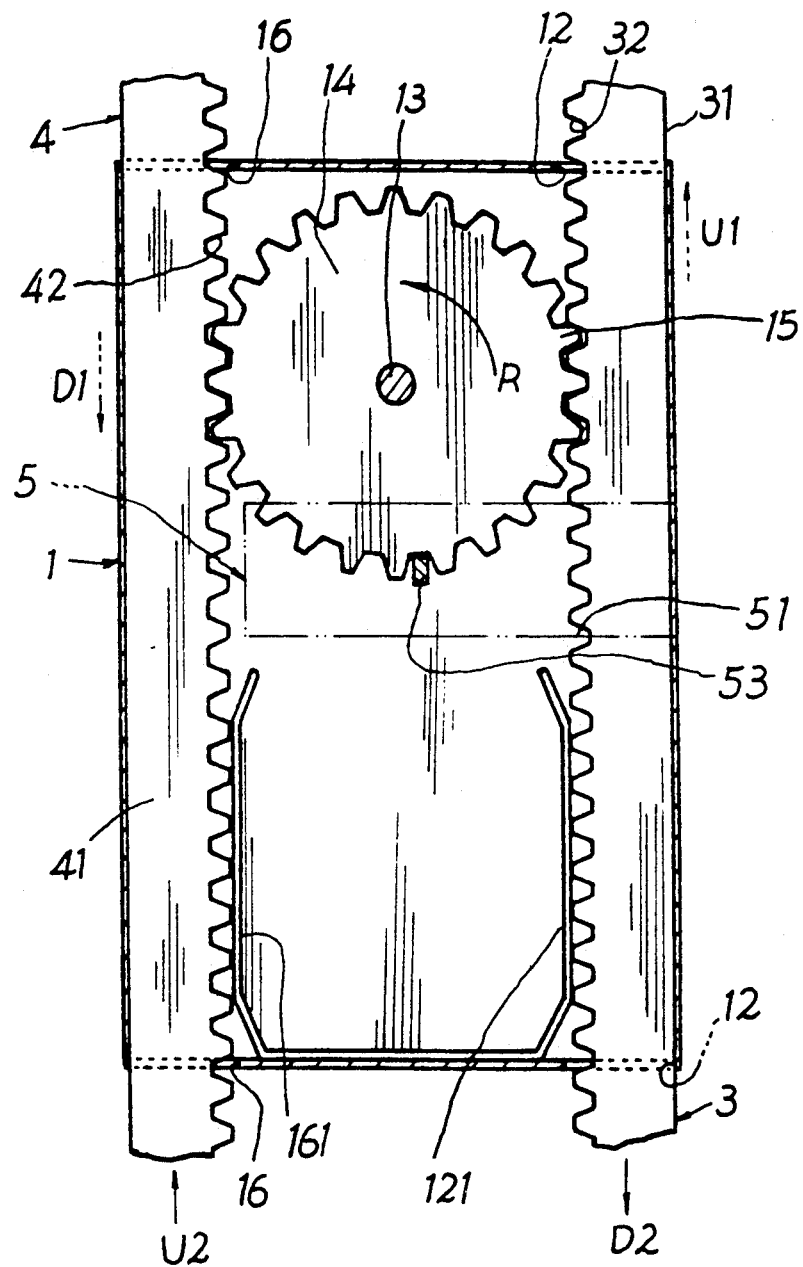
FIG. 5 is an illustration showing an extending mechanism of the present invention.
Figure 6:
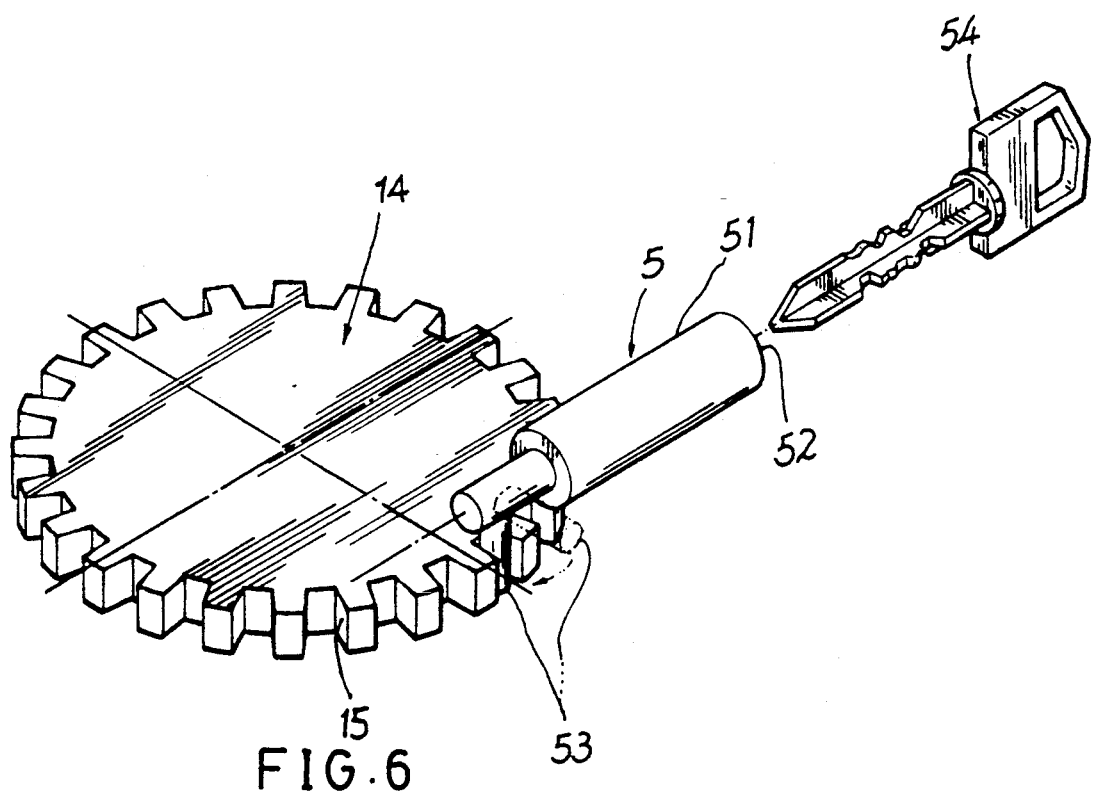
FIG. 6 shows a positioning lock of the present invention.

As shown in FIGS. 1 and 5, when using the present invention, the upper hook member 23 is firstly hanged on the steering wheel S by adjusting the bolt 22 beyond the cylinder 21, and the stopping member 33 of the brake locking means 3 may be first pulled upwardly (U1) to rotate the gear in a counterclockwise direction R to move the second rack 41 of the accelerator locking means 4 in a downward direction D1 to lower the lower hook member 43 downwardly until being capable for hooking up the accelerator pedal A, the stopping member 33 is then depressed downwardly (D2) to thereby raise the second rack 41 to pull the lower hook member 43 upwardly (U2) to increase the tension force between the two hook members 23, 43 and a key 54 is inserted into the key hole in the core 52 for rotating the latch member 53 for locking the gear teeth 15 (FIG. 6), thereby simultaneously locking the steering wheel S, the accelerator pedal A and the brake pedal B for preventing stealing driving of the car and also for braking the car for preventing its slipping on a sloping road surface.

For some application conditions, the hook members 23 may be oriented upwardly (U3) as shown in FIG. 7 for upwardly retaining the steering wheel S. The lower hook member 43 as shown in FIG. 7 may be rotated in R1 direction from the solid line to the position of dotted line and then fixed with rivet 44 to be concave upwardly (U2) for locking the accelerator A, while depressibly (D2) locking the stopping member 33 on the brake B.

I claim:

1. A car lock comprising:

a main box having a positioning lock secured on the main box; a steering-wheel locking means protruding upwardly from the main box for operatively locking a steering wheel of a car;

a brake locking means movably disposed on a first side portion of said main box for downwardly depressibly locking a brake pedal of the car; and an accelerator locking means movably disposed on a second side portion of said main box opposite to said brake locking means for operatively locking an accelerator pedal;

said positioning lock operatively locking said brake locking means and said accelerator locking means at their locking positions while said steering-wheel locking means lockable with said steering wheel;

said main box including: a first rack hole formed in a first side portion of the box for movably holding a first rack of the brake locking means in the first rack hole as slidably limited by a first guiding plate secured in the first side portion of the box, a second rack hole formed in a second side portion of the box for movably holding a second rack of the accelerator locking means in the second rack hole as slidably limited by a second guiding plate secured in the second side portion of the box, a gear rotatably mounted in the box about a shaft secured in the box in between the first and second racks for simultaneously engaging the two racks diametrically disposed on two opposite sides of the gear having gear teeth circumferentially formed on a perimeter of the gear; said gear being operatively locked by said positioning lock; and said steering-wheel locking means including: a cylinder having female threads formed in a through hole in the cylinder longitudinally protruding upwardly from a side wall of the main box, a bolt having male threads formed on the bolt and engageable with the through hole in the cylinder having an upper bracket formed on an upper end portion of the bolt, and an upper hook member fixed on the upper bracket by an upper rivet for operatively locking a steering wheel of the car.

2. A car lock according to claim 1, wherein said brake locking means includes: the first rack having a plurality of first rack teeth longitudinally formed on the first rack to be engageable with the gear teeth of the gear rotatably mounted in the main box with the first rack movably held in a first side portion of the main box, and a bifurcate stopping member generally formed as an inversed-U-shape for depressibly retaining a brake pedal.

3. A car lock according to claim 1, wherein said accelerator locking means includes: the second rack having a plurality of second rack teeth longitudinally formed on the second rack to be engageable with the gear teeth of the gear rotatably mounted in the box with the second rack movably held in a second side portion of the main box opposite to the first rack of the brake locking means, a lower hook member fixed on a lower bracket by a lower rivet at a lower end portion of the rack for operatively locking a brake pedal of a car.

4. A car lock according to claim 1, wherein said positioning lock includes: a lock body transversely formed on the main box having a lock core rotatably mounted in the hook body, and a latch member secured on an inner end portion of the lock core operatively engageable with any one gear tooth of the gear for locking and preventing the rotation of the gear when inserting a key into a key hole formed in the core for angularly rotating the core and the latch member.

* * * * *